United States Patent
Chung et al.

(10) Patent No.: US 11,641,038 B2
(45) Date of Patent: May 2, 2023

(54) POUCH-TYPE SECONDARY BATTERY AND BATTERY MODULE INCLUDING THE SAME

(71) Applicant: SK Innovation Co., Ltd., Seoul (KR)

(72) Inventors: Gyu Jin Chung, Daejeon (KR); Sun Mo An, Daejeon (KR); Tae Il Kim, Daejeon (KR); Won Seok Jeong, Daejeon (KR)

(73) Assignee: SK ON CO., LTD., Seoul (KR)

( * ) Notice: Subject to any disclaimer, the term of this patent is extended or adjusted under 35 U.S.C. 154(b) by 34 days.

(21) Appl. No.: 16/812,750

(22) Filed: Mar. 9, 2020

(65) Prior Publication Data

US 2020/0295313 A1   Sep. 17, 2020

(30) Foreign Application Priority Data

Mar. 12, 2019   (KR) .......................... 10-2019-0028286

(51) Int. Cl.
| | |
|---|---|
| *H01M 50/116* | (2021.01) |
| *H01M 10/613* | (2014.01) |
| *H01M 50/183* | (2021.01) |
| *H01M 50/186* | (2021.01) |
| *H01M 50/105* | (2021.01) |

(52) U.S. Cl.
CPC ....... *H01M 10/613* (2015.04); *H01M 50/105* (2021.01); *H01M 50/186* (2021.01)

(58) Field of Classification Search
None
See application file for complete search history.

(56) References Cited

U.S. PATENT DOCUMENTS

| | | | | |
|---|---|---|---|---|
| 2016/0380302 A1* | 12/2016 | Yun | ................... | H01M 10/0587 |
| | | | | 29/623.5 |
| 2018/0138565 A1* | 5/2018 | Lee | ..................... | H01M 50/209 |

FOREIGN PATENT DOCUMENTS

KR   10-2017-0101650 A   9/2017

OTHER PUBLICATIONS

Chemical Engineering and Research and Design, vol. 85, Issue 3, 2007, p. 320-328 (Year: 2007).*

* cited by examiner

*Primary Examiner* — Maria Laios
*Assistant Examiner* — Bartholomew A Hornsby
(74) *Attorney, Agent, or Firm* — IP & T Group LLP (57) ABSTRACT

A pouch-type secondary battery includes an electrode assembly, and a pouch member in which the electrode assembly is accommodated and a sealing portion is formed on an edge of the pouch member, where the sealing portion protruding on one side surface extends in a diagonal direction towards the other side surface adjacent to the at least one side surface.

10 Claims, 4 Drawing Sheets

POUCH-TYPE SECONDARY BATTERY AND BATTERY MODULE INCLUDING THE SAME

CROSS-REFERENCE TO RELATED APPLICATION (S)

This application claims benefit of priority to Korean Patent Application No. 10-2019-0028286 filed on Mar. 12, 2019 in the Korean Intellectual Property Office, the disclosure of which is incorporated herein by reference in its entirety.

BACKGROUND

1. Field

The present disclosure relates to pouch-type secondary battery and a battery module including the same.

2. Description of Related Art

With increased demand for mobile devices along with the development of related technologies, demand for a secondary battery as an energy source has rapidly increased. A secondary battery may be repeatedly charged and discharged as mutual conversion between chemical energy and electrical energy is reversible in a secondary battery. A pouch member of a secondary battery refers to a laminated film case for protecting a positive electrode, a negative electrode, a separation film, and an electrolyte solution, i.e., the main components of a secondary battery.

Such a pouch member has been used as a case of a lithium ion polymer battery or a dual-layer electrical capacitor. To use a secondary battery as a battery for a vehicle or a battery for an energy storage system, it has been necessary to secure long-term durability, durability sustained for 10 years or longer.

Also, as specifications required for a high-capacity and high-power secondary battery have increased, it has been necessary to develop a secondary battery which can implement high-energy density and high-performance cooling in accordance with the above-described requirements.

To satisfy such specifications, a cooling structure has been changed to use water-cooling, and a secondary battery capable or performing one-sided downward cooling has become a main trend in the market. However, by simply using one-sided cooling, there may be a limitation in satisfying the above-described specifications.

Further, a general pouch-type secondary battery has a limitation in that a general pouch-type secondary battery has an unnecessary feature which may degrade energy density in terms of a manufacturing method or a manufacturing process.

As a method for overcoming the above-described limitations, a method of configuring a lead tap to be offset to one side may be used, but in this case, it may be difficult to secure a sufficient spacing distance between electrode assemblies during a bonding process for electrical connection between electrode assemblies, which may cause an issue in safety.

Thus, to address the above-described issues and limitations, research on a pouch-type secondary battery and a battery module including the same may be necessary.

SUMMARY

An aspect of the present disclosure is to provide a pouch-type secondary battery capable of double-sided cooling and a battery module including the same.

Another aspect of the present disclosure is to provide a secondary battery from which an unnecessary feature which may degrade energy density has been eliminated, and a battery module including the same.

According to an aspect of the present disclosure, a pouch-type secondary battery includes an electrode assembly, and a pouch member in which the electrode assembly is accommodated and a sealing portion is formed on an edge of the pouch member, where the sealing portion protruding on one side surface extends in a diagonal direction towards the other side surface adjacent to the at least one side surface.

The sealing portion may include a horizontal protrusion configured to protrude from one side surface of an accommodation case of the pouch member in which the electrode assembly is accommodated, and to protrude horizontal in a length direction of the one side surface of the accommodation case, and an inclined protrusion configured to be connected to both ends of the horizontal protrusion and to extend slanting with respect to the length direction of the one side surface of the accommodation case.

The inclined protrusion may be configured to extend in direction of a corner or the other side surface of the accommodation case adjacent to the one side surface of the accommodation case.

The horizontal protrusion may be configured to be adhered to a lead tap portion of the electrode assembly, connected to an electrode of the electrode assembly and exposed externally, and to have a shape corresponding to a shape of the lead tap.

The inclined protrusion may have a thickness less than a thickness of the horizontal protrusion.

According to another aspect of the present disclosure, a pouch-type secondary battery includes an electrode assembly, and pouch member in which tale electrode assembly is accommodated and a seal portion extending from central portion of at least one of side surfaces and a corner of the other side surface is disposed.

The sealing portion may include a horizontal protrusion configured to extend vertically to a central portion or one side surface of an accommodation case of the pouch member in which the electrode assembly is accommodated, and an inclined protrusion configured to be connected to both ends of the horizontal protrusion and to extend slantingly from a corner of the other side surface of the accommodation case adjacent to the one side surface.

The horizontal protrusion may be configured to be adhered to a lead tap of the electrode assembly, connected to an electrode of the electrode assembly and exposed externally, and to have a shape corresponding to a shape of the lead tap.

According to another aspect of the present disclosure, a battery module includes a pouch-type secondary battery, and a housing member in which the pouch-type secondary battery is accommodated.

In the housing member, an inclined protrusion may be accommodated, and the inclined protrusion may be configured to be folded to be adhered to an accommodation case.

The housing member may include a frame in which a plurality of the pouch-type secondary batteries are accommodated through an open upper surface, and a cover configured to cover the open upper surface of the frame.

The cover may be configured to be coupled to the frame and to pressure the inclined protrusion such that the inclined protrusion is folded.

The housing member may include a lower cooling portion disposed on a lower surface of the frame and configured to receive heat generated in the pouch-type secondary battery and to cool the pouch-type secondary battery, and an upper cooling portion disposed on an upper surface of the cover and configured to receive heat generated in the pouch-type secondary battery and to cool the pouch-type secondary battery.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, example embodiments of the present disclosure will be described with reference to the accompanying drawings. The present disclosure is not limited to example embodiments, and it is to be understood that modifications can be made without departing from the spirit and scope of the present disclosure. Shapes and sizes of the elements in the drawings may be exaggerated for clarity of description.

An expression used in the singular encompasses the expression of the plural, unless it has a clearly different meaning in the context. Identical or corresponding elements will be given the same reference numerals.

Example embodiments of the present disclosure relate to a pouch-type secondary battery 100 and a battery module including the same. According to the example embodiments, double-sided cooling may be performed in the pouch-type secondary battery 100 such that high-performance cooling may be available.

According to another aspect of the present disclosure, an unnecessary feature which may degrade energy density may be eliminated such that specifications required for a high-capacity and high-power secondary battery, based on high energy density, may be satisfied.

Figure 1:
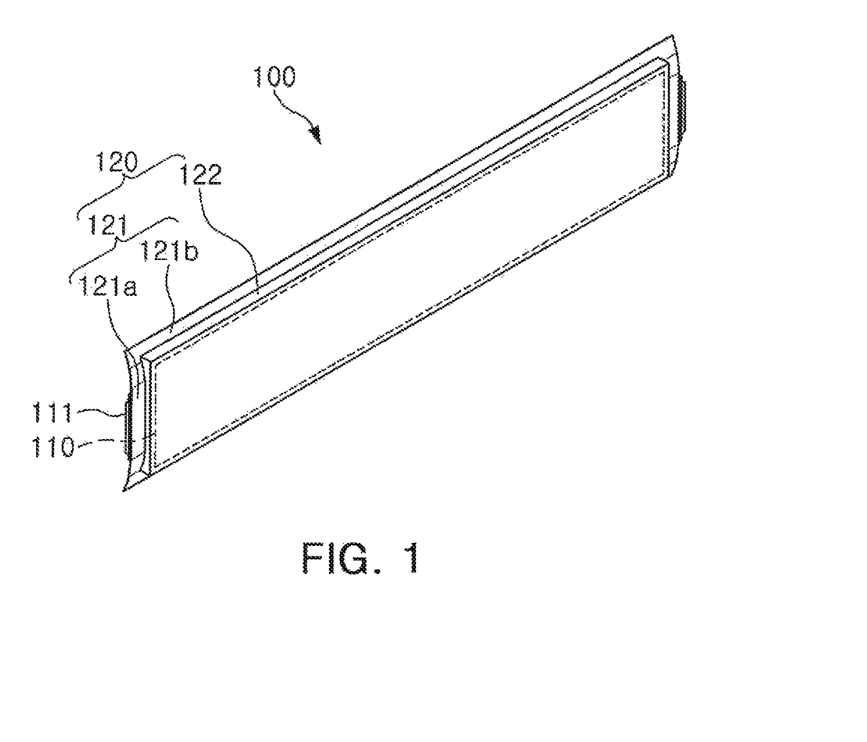
FIG. 1 is a perspective view illustrating a pouch-type secondary battery according to an example embodiment of the present disclosure.

FIG. 1 is a perspective view illustrating a pouch-type secondary battery according to an example embodiment. Referring to FIG. 1, the pouch-type secondary battery 100 in the example embodiment may include an electrode assembly 110, and a pouch member 120 in which the electrode assembly 110 is accommodated and a sealing portion 121 is formed on an edge of ouch member 120, where the sealing portion 121 protruding on one side surface may extend in a diagonal direction towards the other side surface adjacent no the at least one side surface.

As described above, in the pouch member 120, the sealing portion 121 coupled to seal the electrode assembly 110 may be configured to protrude in a form of a flange, and the sealing portion 121 protruding on the one side surface may be configured to be inclined towards the other side surface adjacent to the one side surface. Accordingly, when the pouch-type secondary battery 100 is coupled to a housing member 200 such as a battery module, or the like, a space for the sealing portion 121 may be reduced.

The electrode assembly 110 may be configured as a secondary battery n which mutual conversion between chemical energy and electrical energy may be reversible such that the electrode assembly 110 may be rerepeatedly charged and discharged. The electrode assembly 110 may be implemented by a generally used secondary battery. For example, in the electrode assembly 110, a negative electrode and a positive electrode may be alternately stacked with a separation film interposed therebetween, and surfaces of the negative electrode and the positive electrode, coated with an electrode active material, may oppose each other.

The electrode assembly 110 may be substantially accommodated in the pouch member 120 together with an electrolyte solution. The electrolyte solution may include an organic solvent such as ethylene carbonate (EC), propylene carbonate (PC), diethyl carbonate (DEC), ethyl methyl carbonate (EMC), dimethyl carbonate (DMC), or the like, together with a lithium salt such as $LiPF_6$, $LiBF_4$, or the like. Also, the electrolyte solution may be liquid, solid, or gel-type.

The pouch member 120 may accommodate and protect the electrode assembly 110. To this end, the pouch member 120 may have a vessel form to provide an internal space in which the electrode assembly 110 and an electrolyte solution are accommodated. A portion of a lead tap 111 of the electrode assembly 110 may be externally exposed from the pouch member 120.

The pouch-type secondary battery 100 configured as above may be implemented as a nickel metal hydrogen (Ni-MH) battery, a lithium ion (Li-ion) battery, or the like, which may be charged and discharged, and the pouch-type secondary battery 100 may generate current. A plurality of the pouch-type secondary batteries 100 may be stacked in the housing member 200.

In the pouch member 120, the sealing portion 121 may be disposed to seal an edge of the pouch member 120 in which the electrode assembly 110 is disposed. Accordingly, the pouch member 120 may protect the electrode assembly 110.

The sealing portion 121 may be configured to protrude horizontally from a central portion of one side surface in a direction perpendicular to the one side surface, rather than protruding horizontally from central portions of all side surfaces of the pouch member 120 in a direction perpendicular to the side surfaces, and the sealing portion 121 may be configured to extend in a diagonal direction, a direction inclined with respect to a direction perpendicular to the other surface adjacent to the one side surface.

As an example, the sealing portion 121 may be configured to protrude horizontally from a central portion of one side surface, a right and left side surface 122c, in a direction perpendicular to the one side surface, and may be configured to extend in a diagonal direction, inclined with respect to a direction perpendicular to the other side surface adjacent to the one side surface, an upper side surface 122a or a lower side surface 122b.

Accordingly, the sealing portion 121 may be disposed in a diagonal direction with respect to the other side surface of the pouch member 120. Accordingly, as an example, when the pouch-type secondary battery 100 is coupled to the housing member 200, as the sealing portion 121 does not protrude perpendicularly to the upper side surface 122a or the lower side surface 122b, the other side surfaces of the pouch member 120 in contact with an upper surface and a lower surface of the housing member 200, on the upper side surface 122a or the lower side surface 122b, a space in which the sealing portion 121 is disposed may not be necessary such that the space for the sealing portion 121 may be reduced.

Also, by configuring the sealing portion 121 as above, the upper surface and the lower surface of the housing member 200 may be directly or indirectly adhered to and coupled to the upper side surface 122a or the lower side surface 122b of the pouch member 120, and accordingly, double-sided cooling may be available.

The sealing portion 121 may include a horizontal protrusion 121a and an inclined protrusion 121b, and the elements will be described in greater detail with reference to FIGS. 2 and 3.

A lead tap 111 may be coupled to the horizontal protrusion 121a and may be externally exposed. Accordingly, the horizontal protrusion 121a of the pouch-type secondary battery 100 may be adhered to the lead tap 111 of the electrode assembly 110, connected to an electrode of the electrode assembly 110 and exposed externally, and may have a shape corresponding to a shape of the lead tap 111.

In other words, the horizontal protrusion 121a coupled to the lead tap 111 may externally expose the lead tap 111 and may seal a portion of the electrode assembly 110 connected to the lead tap 111.

The horizontal protrusion 121a may protrude from a central portion of one side surface of an accommodation case 122 of the pouch member 120 in which the electrode assembly 110 is accommodated in a direction perpendicular to the one side surface of the accommodation case 122, and may be disposed horizontally with respect to a length direction of the one side surface of the accommodation case 122. Accordingly, when the pouch-type secondary batteries 100 are stacked, a spacing distance between the lead taps 111 of the pouch-type secondary batteries 100 may be sufficiently secured. Accordingly, electrical connection between the lead tap 111 and an external device may be easily performed.

Figure 2:
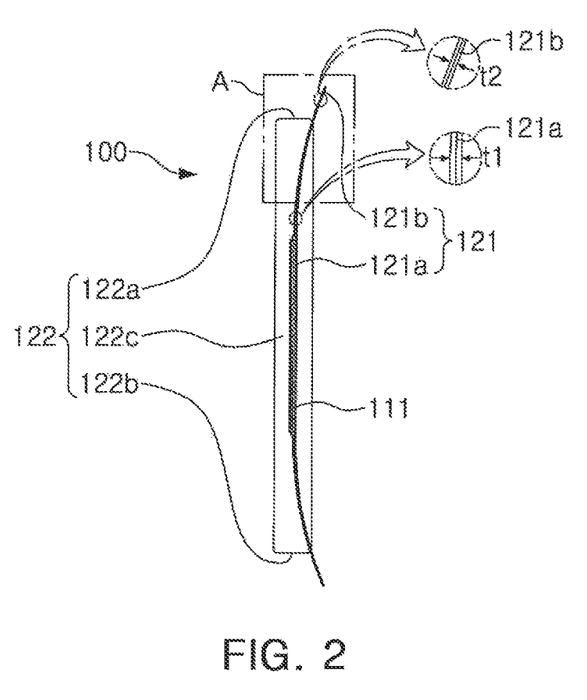
FIG. 2 is a side view illustrating a pouch-type secondary battery according to an example embodiment of the present disclosure.
Figure 3A:
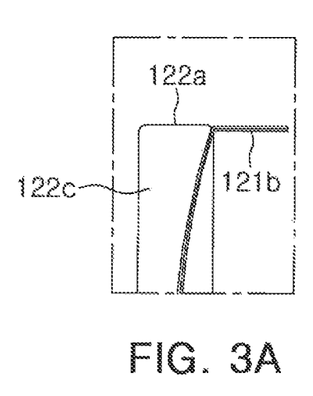
FIG. 3A, FIG. 3B and FIG. 3C are side views illustrating a state of a pouch-type secondary battery in which an inclined protrusion is folded in a direction of an accommodation case according to an example embodiment of the present disclosure.
Figure 3B:
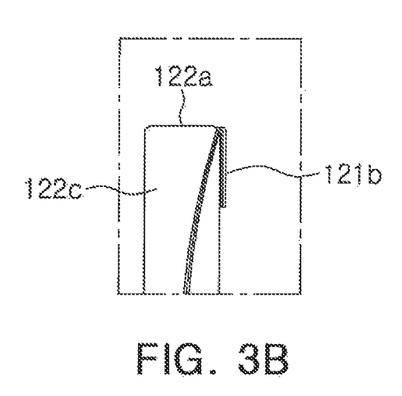
Figure 3C:
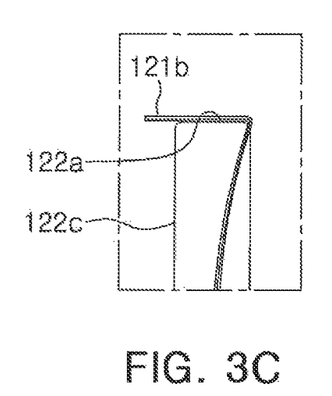

FIG. 2 is a side view illustrating a pouch-type secondary battery 100 according to an example embodiment. FIG. 3A, FIG. 3B and FIG. 3C are side views illustrating a state of a pouch-type secondary battery 100 in which an inclined protrusion 121b is folded in a direction of an accommodation case 122 according to an example embodiment.

Referring to the diagrams, a sealing portion 121 of a pouch-type secondary battery 100 in the example embodiment may include a horizontal protrusion 121a configured to protrude from one side surface of an accommodation case 122 of a pouch member 120 in which an electrode assembly 110 is accommodated and to protrude horizontally with respect to a length direction of the one side surface of the accommodation case 122, and an inclined protrusion 121b configured to be connected to both ends of the horizontal protrusion 121a and to extend slantingly with respect to the length direction of the one side surface of the accommodation case 122.

Accordingly, the sealing portion 121 may include the horizontal protrusion 121a and the inclined protrusion 121b, which are configured to protrude horizontally from a central portion of the one side surf of the accommodation case 122 in a direction perpendicular to the one side surface, and to extend in a diagonal direction, a direction inclined with respect to a direction perpendicular to the other side surface adjacent to the one side surface.

The horizontal protrusion 121a may be configured to protrude horizontal in a length direction of the one side surface of the accommodation case 122. As an example, the horizontal protrusion 121a may have a form of a flange extending and protruding from a central portion of the one side surface of the accommodation case 122 in a direction perpendicular to the one side surface of the accommodation case 122.

A lead tap 111 may be coupled to and adhered to the horizontal protrusion 121a and the lead tap 111 may be externally exposed.

The inclined protrusion 121b may extend from both ends of the horizontal protrusion 121a to protrude to the other side surface adjacent to the one side surface of the accommodation case 122.

The inclined protrusion 121b may be configured to protrude to the other side surface of the accommodation case 122, and may extend slantingly from a central portion of the one side surface of the accommodation case 122 in a direction of an edge of the other side surface of the accommodation case 122.

The inclined protrusion 121b may be configured to have a form of a flange configured to protrude to extend to the other side surface of the accommodation case 122 and to be inclined with respect to a length direction of the one side surface of the accommodation case 122.

As an example, the inclined protrusion 121b may have a form of a curved flange or an inclined plate, curved or inclined towards the other side surface of the accommodation case 122.

In other words, the inclined protrusion 121b may extend from the both ends of the horizontal protrusion 121a and may be inclined curvedly or linearly with respect to a length direction of the one side surface of the accommodation case 122.

The inclined protrusion 121b of the pouch-type secondary battery 100 may also be configured to extend in a direction of a corner of the other side surface of the accommodation case 122 adjacent to the one side surface of the accommodation case 122.

In other words, the inclined protrusion 121b may be configured to extend slantingly from a central portion of the one side surface of the accommodation case 122 and to pass through a corner of the other side surface, an end of an edge of the other side surface of the accommodation case 122.

Accordingly, when the pouch-type secondary battery 100 is mounted on the housing member 200, the inclined protrusion 121b may be folded to be adhered to a front surface or a rear surface adjacent to the one side surface and the other side surface of the accommodation case 122 on a corner of the other side surface of the accommodation case 122 having a parallelepiped form or may be folded to be adhered to the other side surface of the accommodation case 122 such that the pouch-type secondary battery 100 may be easily accommodated in the housing member 200. The configuration will be described in greater detail with reference to FIG. 4.

According to another example embodiment, a pouch-type secondary battery 100 may include an electrode assembly 110, and a pouch member 120 in which the electrode assembly 110 is accommodated and which includes a sealing portion 121 extending from a corner of at least one of side surfaces.

Accordingly, in an example embodiment, the sealing portion 121 may extend from a central portion of one side surface of an accommodation case 122 in which the electrode assembly 110 is accommodated and may extend in a diagonal direction towards a corner of the other side surface of the accommodation case 122 adjacent to the one side surface of the accommodation case 122, and in another example embodiment, the sealing portion 121 may extend from a central portion of the one side surface of the accommodation case 122 towards a corner of the other side surface of the accommodation case 122 adjacent to the one side surface of the accommodation case 122, extending in a vertical or a horizontal direction, rather than extending in a diagonal direction.

As an example in which the sealing portion 121 extends diagonally to a corner of the other side surface of the accommodation case 122, the sealing portion 121 of the electrode assembly 110 of the example embodiment may include a horizontal protrusion 121a configured to extend vertically to the one side surface of the accommodation case 122 of the pouch member 120 in which the electrode assembly 110 is accommodated, and an inclined protrusion 121b configured to be connected to both ends of the horizontal protrusion 121a and to extend slantingly from a corner of the other side surface of the accommodation case 122 adjacent to the one side surface of the accommodation case 122.

Accordingly, the inclined protrusion 121b may extend slantingly from a central portion of the one side surface of the accommodation case 122 and may pass through the corner of the other side surface of the accommodation case 122, an end of an edge of the other side surface.

Also, the inclined protrusion. 121b of the pouch-type secondary battery 100 in the example embodiment may be configured to have a thickness less than thickness of the horizontal protrusion 121a.

When a thickness t2 of the inclined protrusion 121b configured to be inclined with respect to the accommodation case 122 is less than a thickness t1 of the horizontal protrusion 121a, a form of the horizontal protrusion 121a may be maintained and the inclined protrusion 121b may easily be folded in a direction of a front surface, a rear surface, or the other side surface of the accommodation case 122 when the pouch-type secondary battery 100 is mounted on the housing member 200.

In other words, by reducing the thickness t2 of the inclined protrusion 121b, it may be easy to change the forms of the elements.

Figure 4:
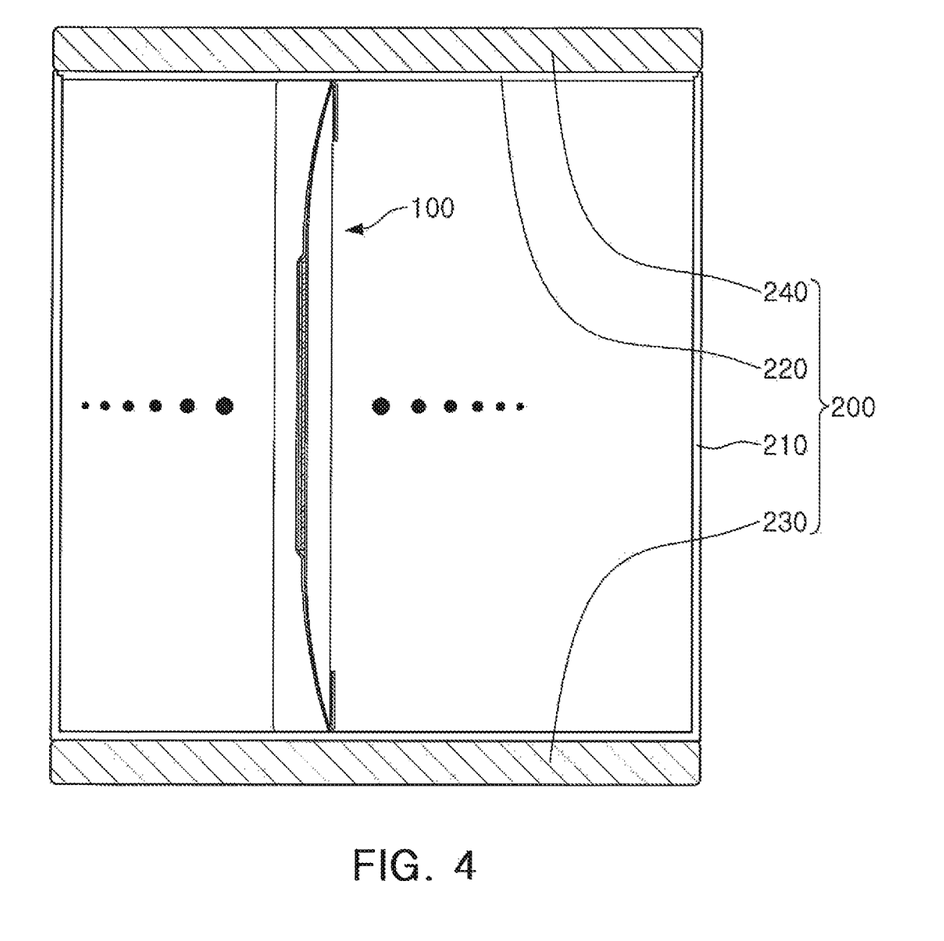
FIG. 4 is a side view illustrating a battery module including a pouch-type secondary battery according to an example embodiment of the present disclosure.

FIG. 4 is a side view illustrating a battery module including a pouch-type secondary battery 100 according to an example embodiment. Referring to FIG. 4, a battery module of another example embodiment may include a pouch-type secondary battery 100 and a housing member 200 in which a plurality of the pouch-type secondary batteries 100 are accommodated.

In the pouch-type secondary battery 100, a sealing portion 121 of a pouch member 120 may be disposed in a diagonal direction with respect to the other side surface of the pouch member 120. Accordingly, a space in which the sealing portion 121 is disposed may not be necessary such that a space for the sealing portion 121 may be reduced.

The sealing portion 121 may include an inclined protrusion 121b configured to protrude to the other side surface of an accommodation case 122 and to extend slantingly from a central portion of one side surface of the accommodation case 122 in a direction of an edge of the other side surface of the accommodation case 122. Accordingly, the inclined protrusion 121b may be folded to be adhered to a front surface or a rear surface adjacent to the one side surface and the other side surface of the accommodation case 122 on a corner of the other side surface of the accommodation case 122 having a parallelepiped form, or may be folded to be adhered to the other side surface of the accommodation case 122 when the pouch-type secondary battery 100 is mounted on the housing member 200. Accordingly, the pouch-type secondary battery 100 may be easily accommodated in the housing member 200, and a space in which the inclined protrusion 121b is disposed may be reduced.

As an example, the inclined protrusion 121b accommodated in the housing member 200 may be folded before the pouch-type secondary battery 100 is accommodated in the housing member 200.

Thus, in the housing member 200 of the battery module of the example embodiment, the inclined protrusion 121b may be folded to be adhered to the accommodation case 122.

In other words, as the plurality of pouch-type secondary batteries 100 in each of which the inclined protrusion 121b is folded are accommodated in the housing member 200, a space occupied by the inclined protrusion 121b protruding from a central portion of the other side surface of the accommodation case 122 may be reduced such that performances of relatively high-integration and high-capacity of the battery module may be secured for the same volume.

The housing member 200 may include a frame 210 and a cover 220 to accommodate the pouch-type secondary battery 100.

The housing member 200 of the battery module of the example embodiment may include the frame 210 in which the plurality of pouch-type secondary batteries 100 are accommodated through an open upper surface, and the cover 220 configured to cover the open upper surface of the frame 210.

The frame 210 may have a form of a box having a parallelepiped shape in which only the upper surface is open. The cover 220 may be configured to cover the open upper surface of the frame 210.

The cover 220 of the battery module in the example embodiment may be coupled to the frame 210 and may pressure the inclined protrusion 121b such that the inclined protrusion 121b may be folded.

In other words, after the inclined protrusion 121b, inclined with respect to the other side surface of the accommodation case 122, accommodated in the frame 210 while not being folded, and when the cover 220 covers the upper surface of the frame 210 and is coupled to the frame 210, the cover 220 may pressure an upper end of the pouch-type secondary battery 100 in a downward direction such that the inclined protrusion 121b may be folded in a direction of a front surface, a rear surface, or the other side surface of the accommodate on case 122, and a dispositional space thereof may be reduced.

Also, the housing member 200 of the battery module in the example embodiment may include a lower cooling portion 230 disposed on a lower surface of the frame 210 and configured to receive heat generated in the pouch-type secondary battery 100 and to cool the pouch-type secondary battery 100, and an upper cooling portion 240 disposed on an upper surface of the cover 220 and configured to receive heat generated in the pouch-type secondary battery 100 and to cool the pouch-type secondary battery 100.

As the inclined protrusion 121b accommodated in the housing member 200 is folded in a direction of a front surface, a rear surface, or the other s de surface of the accommodation case 122, the upper cooling portion 240 and the lower cooling portion 230 may be in contact with an upper side surface 122a and a lower side surface 122b, respectively, which are the other side surfaces of upper and lower portions of the accommodation case 122. Accordingly, the battery module in the example embodiment may perform double-sided cooling with respect to the pouch-type secondary battery 100.

The lower cooling portion 230 and the upper cooling portion 240 may be structures for performing air-cooling or water-cooling, and any structure which may receive heat from the pouch type secondary battery 100 and may cool the pouch-type secondary battery 100 may be used.

According to the aforementioned example embodiments, the pouch-type secondary battery nd the battery module including the same may perform double-sided cooling. Accordingly, high-performance cooling may be available.

Also, the pouch-type secondary battery and the battery module including the same may address an unnecessary feature which may degrade energy density.

While tale example embodiments have been shown and described above, it will be apparent to those skilled in the art that modifications and variations could be made without departing from the scope or the present invention as defined by the appended claims.

What is claimed is:

1. A pouch-type secondary battery, comprising:
   an electrode assembly; and
   a pouch member in which the electrode assembly is accommodated,
   wherein the pouch member comprises:
   an accommodation case in which the electrode assembly is accommodated, comprising a first side surface on which at least one lead tab is disposed and a second side surface extending in a direction different from the first side surface; and
   a sealing portion formed on the first side surface and the second side surface of the accommodation case,
   wherein the sealing portion comprises:
   a horizontal protrusion configured to protrude on the first side surface; and
   an inclined protrusion configured to be connected to an end of the horizontal protrusion and to extend from an edge of the second side surface,
   wherein the horizontal protrusion comprises:
   a first protrusion surrounding the lead tab, disposed to be spaced apart from a first edge of the first side surface and a second edge of the first side surface opposite to the first edge, and extending in parallel with the first edge; and
   a second protrusion extending in a direction inclined with respect to the first edge and connected to the inclined protrusion.

2. The pouch-type secondary battery of claim 1, wherein the sealing portion includes:
   the horizontal protrusion configured to extend vertically to the first side surface of the accommodation case; and
   the inclined protrusion configured to extend in a diagonal direction inclined with respect to a direction perpendicular to the second side surface.

3. The pouch-type secondary battery of claim 1, wherein the sealing portion is formed around the accommodation case of the pouch member.

4. The pouch-type secondary battery of claim 2, wherein the horizontal protrusion is configured to be adhered to the lead tab, and to have a shape corresponding to a shape of the lead tab,
   wherein the lead tab is configured to connect to an electrode of the electrode assembly and exposed externally.

5. A battery module, comprising:
   a plurality of pouch-type secondary batteries; and
   a housing in which the plurality of pouch-type secondary batteries are accommodated,
   wherein each pouch-type secondary battery includes:
   an electrode assembly; and
   a pouch member in which the electrode assembly is accommodated,
   wherein the pouch member comprises:
   an accommodation case in which the electrode assembly is accommodated, comprising a first side surface on which at least one lead tab is disposed and a second side surface extending in a direction different from the first side surface; and
   a sealing portion formed on the first side surface and the second side surface of the accommodation case,
   wherein the sealing portion comprises:
   a horizontal protrusion configured to protrude on the first side surface of the pouch member; and
   an inclined protrusion configured to be connected to an end of the horizontal protrusion and to extend from an edge of the second side surface of the pouch member,
   wherein the horizontal protrusion comprises:
   a first protrusion surrounding the lead tab, disposed to be spaced apart from a first edge of the first side surface and a second edge of the first side surface opposite to the first edge, and extending in parallel with the first edge; and
   a second protrusion extending in a direction inclined with respect to the first edge and connected to the inclined protrusion.

6. The battery module of claim 5, wherein the inclined protrusion is configured to be folded to be adhered to the accommodation case.

7. The battery module of claim 5, wherein the housing includes:
   a frame in which the plurality of the pouch-type secondary batteries are accommodated through an open upper surface; and
   a cover configured to cover the open upper surface of the frame.

8. The battery module of claim 7, wherein the cover is configured to be coupled to the frame and to press the inclined protrusion such that the inclined protrusion is folded.

9. The battery module of claim 7, wherein the housing comprises:
   a lower cooling portion disposed on a lower surface of the frame and configured to transfer heat generated in the pouch-type secondary battery and to cool the pouch-type secondary battery; and
   an upper cooling portion disposed on an upper surface of the cover and configured to receive heat generated in the pouch-type secondary battery and to cool the pouch-type secondary battery.

10. A battery module comprising:
    a housing including a cover, and lower and upper cooling portions positioned on the cover;
    a plurality of pouch-type secondary batteries positioned inside the housing,
    wherein each pouch-type secondary battery includes an electrode assembly positioned inside a pouch member, having a sealing portion, the sealing portion including a horizontal protrusion extending vertically from a first side surface of the pouch member and an inclined protrusion connected to an end of the horizontal protrusion and extending slantingly from an edge of a second side surface of the pouch member adjacent to the first side surface,
    wherein the horizontal protrusion comprises:
    a first protrusion surrounding a lead tab of the electrode assembly, disposed to be spaced apart from a first edge of the first side surface and a second edge of the first side surface opposite to the first edge, and extending in parallel with the first edge; and
a second protrusion extending in a direction inclined with respect to the first edge and connected to the inclined protrusion,
and
wherein the cover is configured to press the inclined protrusion of each pouch-type secondary battery such that the inclined protrusion is folded.

* * * * *